Patented July 23, 1935

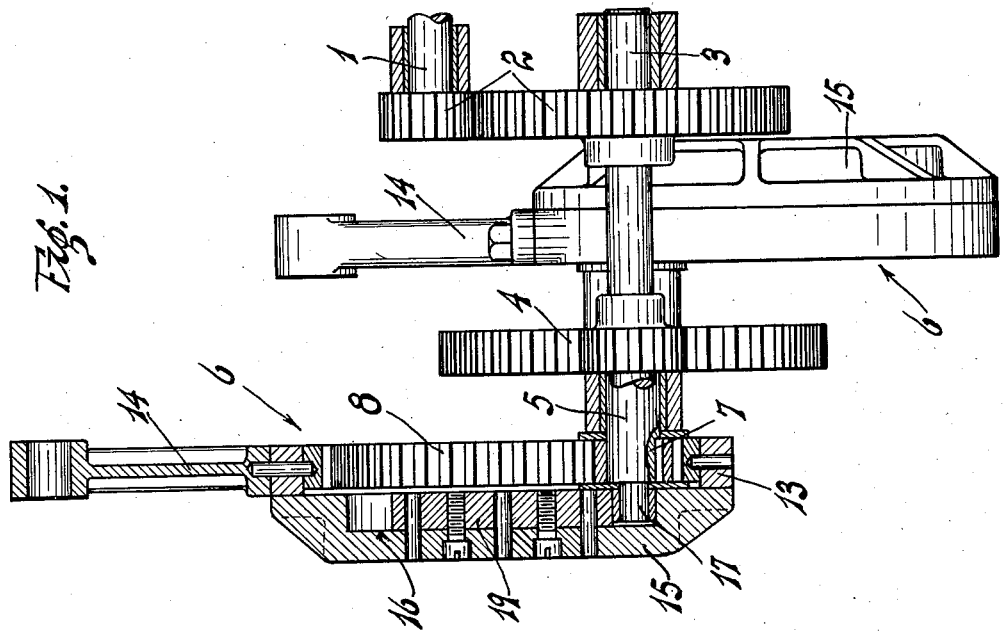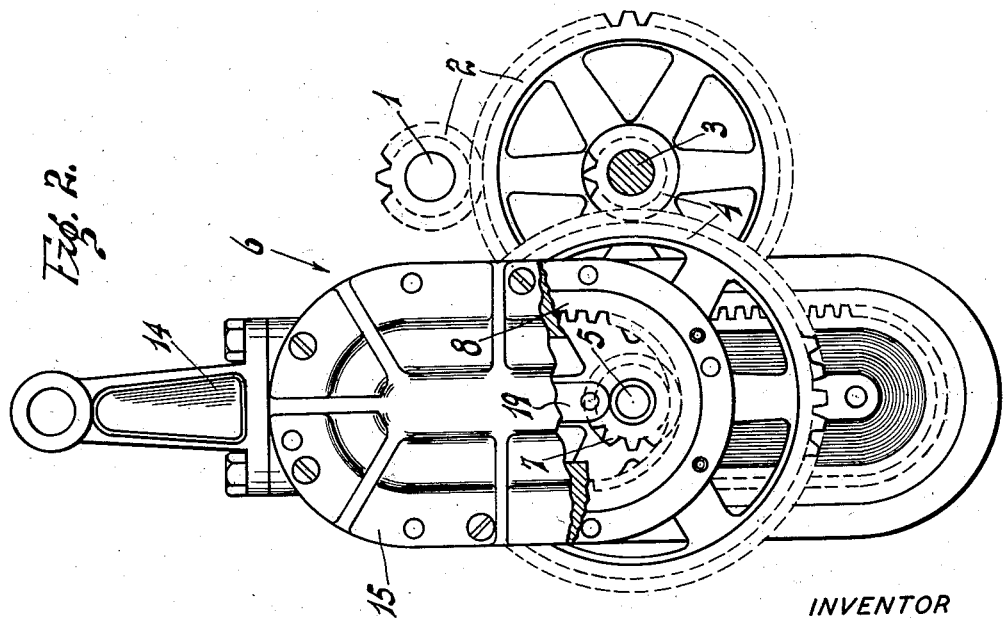

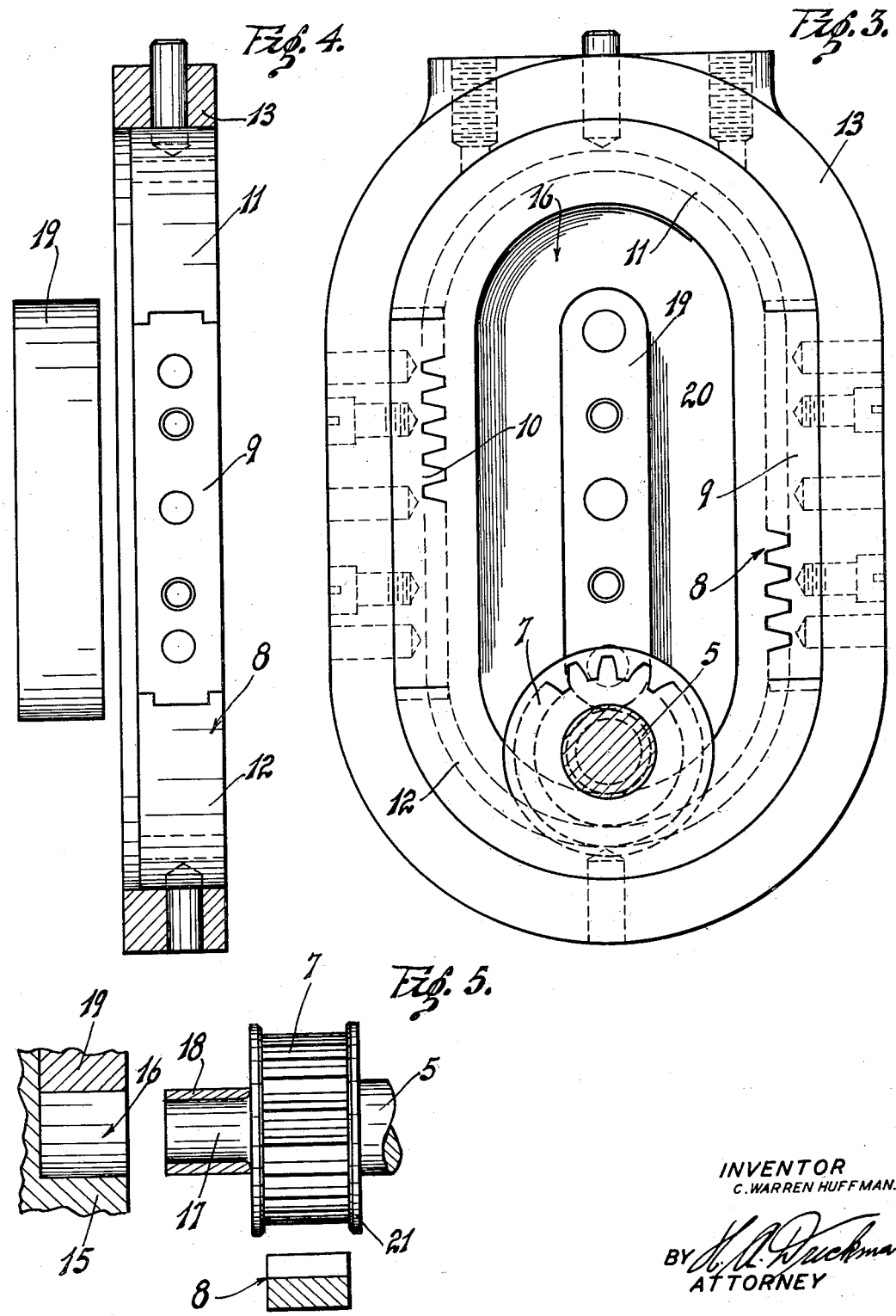

2,008,958

UNITED STATES PATENT OFFICE 2,008,958

COMPOUND GEAR CONNECTING ROD

Conard Warren Huffman, Lynwood, Calif.

Application May 2, 1932, Serial No. 608,687

7 Claims. (Cl. 74—30)

This invention relates to a compound gear connecting rod whereby a reciprocating movement is imparted to any device from a continuously rotating source of power.

The prime object of my invention is to provide a novel elongated gear in the connecting rod whereby the said gear is reciprocated.

Another object is to provide a simple and effective gear construction in connection with a connecting rod whereby an internal elongated gear is caused to move around a continuously rotating pinion. This pinion is held in engagement with the teeth of the elongated gear by a novel and effective elongated race or track thereby imparting a reciprocating movement to the connecting rod.

Other objects, advantages and features of invention may appear from the accompanying drawings, the subjoined detailed description and the appended claims.

In the drawings

Figure 1 is a side elevation of my device with one of the connecting rods being shown in longitudinal section.

Figure 2 is an end view of the same with parts broken away to show interior construction.

Figure 3 is a face view of the gear frame and pinion.

Figure 4 is a longitudinal, sectional view of the gear frame with the gear and the guide block shown in elevation.

Figure 5 is a side view, partly in section of the pinion, a fragment of the guide and the elongated gear being shown.

Referring more particularly to the drawings, the numeral 1 indicates a drive shaft which is rotated from any suitable source of power (not shown). A gear train 2 transmits the movement of the shaft 1 to a jack shaft 3. A gear train 4 then transmits the movement of the jack shaft 3 to the pinion shaft 5. A plurality of connecting rods 6 are operated from the pinion shaft 5 as will be subsequently described. The geared rods 6 are all identical in construction and only one will be described in detail.

A pinion gear 7 is secured to the shaft 5 and this gear meshes with an internal elongated gear 8. The elongated gear is preferably formed by two rack sections 9—10, and two semi-circular gear sections 11—12. The racks and the segmental gears are fitted together as shown in Figures 3 and 4, so as to provide a continuous elongated internal gear. A gear 8 is fitted into a gear frame 13. This frame also includes an arm 14 in which the wrist pin of a cross head or piston or the like is journaled. The gear frame 13 is provided with a housing 15 on one side thereof. This housing may be attached to the gear frame or may be an integral part thereof. The housing 15 is recessed as at 16 so as to receive a trunnion 17 which projects from the pinion 7 or may be an extension of the shaft 5.

A bearing sleeve 18 surrounds the trunnion 17. A guide block 19 is secured or formed in the housing 15, and this guide block is formed with rounded ends so as to conform to the general shape of the recess 16. The trunnion 17 or the sleeve 18 thereon fits closely between the block 19 and the outer wall of the recess 16. This recess conforms in shape and size to the elongated gear 8 so that the pinion 7 will be held in constant and proper pitch line contact with the teeth of the gear 8. The elongated box trackway formed by the wall of the recess 16 and the block 19 will be designated as 20. It will be evident from the foregoing description that when the pinion 7 is rotated the connecting rods 6 will be moved up and down around the pinion in a continuous movement. The elongated gear and the pinion are held in mesh on the pitch line of the teeth by the parallel track 20 into which a trunnion of the pinion or the drive shaft extends. The pinion 7 may be provided with guide flanges 21 on the sides thereof to aid in holding the connecting rod in position.

Having described my invention, I claim:

1. A compound gear connecting rod comprising a pinion, drive means for said pinion, an elongated gear, said pinion meshing with said gear, a gear frame, a housing detachably secured on one side of the gear frame, said housing having an elongated box trackway formed therein, a trunnion projecting from the pinion into the trackway whereby the pinion is held in constant mesh with the elongated gear, and on the pitch line of said gear.

2. A compound gear connecting rod comprising a pinion, drive means for said pinion, an elongated gear, said pinion meshing with said gear, a gear frame in which the elongated gear is mounted, a housing on one side of the gear frame, said housing detachably secured having a recess formed therein, said recess conforming in shape to the elongated gear, a guide block in the recess whereby a box trackway is formed in the housing, and a trunnion projecting from the pinion into the trackway whereby said pinion is held in constant mesh with said elongated gear, and on the pitch line of said gear.

3. A compound gear connecting rod comprising a pinion, means to drive said pinion, an internal elongated gear consisting of two rack segments and two semi-circular gear segments, said pinion meshing with the elongated gear, a frame in which the elongated gear is detachably mounted, a housing detachably secured on one side of the frame, said housing having an elongated box trackway formed therein, said trackway conforming in shape to the elongated gear, and a trunnion projecting from the pinion into the trackway whereby the pinion is held in constant mesh with the elongated gear.

4. A compound gear connecting rod comprising a pinion, means to drive said pinion, an internal elongated gear consisting of two rack segments and two semi-circular gear segments, said pinion meshing with the elongated gear, a frame in which the elongated gear is detachably mounted, a housing detachably secured on one side of the frame, said housing having an elongated box trackway formed therein, said trackway being provided by a block, a recess in the housing, said block being positioned at the center of the recess, said trackway conforming in shape to the elongated gear, and a trunnion projecting from the pinion into the trackway whereby the pinion is held in constant mesh with the elongated gear.

5. A compound gear connecting rod comprising a pinion, drive means for said pinion, an elongated gear with which the pinion meshes, guide flanges on said pinion, said guide flanges being positioned one on either side of said elongated gear, a gear frame, an elongated box trackway detachably secured to the frame, and a trunnion extending from said pinion into the trackway whereby said pinion is held in constant mesh with the elongated gear.

6. A compound gear connecting rod comprising a pinion, drive means for said pinion, an elongated gear, said pinion meshing with said gear, guide flanges on said pinion, said guide flanges being positioned one on either side of said elongated gear, a gear frame, a housing detachably secured on one side of the gear frame, said housing having an elongated box trackway formed therein, a trunnion projecting from the pinion into the trackway whereby the pinion is held in costant mesh with the elongated gear.

7. A compound gear connecting rod comprising a pinion, means to drive said pinion, an internal elongated gear consisting of two rack segments and two semi-circular gear segments, said pinion meshing with the elongated gear, guide flanges on said pinion, said guide flanges being positioned one on either side of said elongated gear, a frame in which the elongated gear is detachably mounted, a housing detachably secured on one side of the frame, said housing having an elongated trackway formed therein, said box trackway being provided by a block, a recess in the housing, said block being positioned at the center of the recess, said trackway conforming in shape to the elongated gear, and a trunnion projecting from the pinion into the trackway whereby the pinion is held in constant mesh with the elongated gear.

CONARD W. HUFFMAN.